Aug. 20, 1968      C. TYJEWSKI      3,397,479
COMBINATION FISHLINE FLOAT AND FISHHOOK REMOVAL TOOL
Filed Oct. 23, 1965

INVENTOR
CEZAR TYJEWSKI

BY  *Roy A. Plant*

ATTORNEY

United States Patent Office 3,397,479
Patented Aug. 20, 1968

3,397,479
COMBINATION FISHLINE FLOAT AND
FISHHOOK REMOVAL TOOL
Cezar Tyjewski, 702 Emmett St.,
Battle Creek, Mich. 49017
Filed Oct. 23, 1965, Ser. No. 503,074
10 Claims. (Cl. 43—44.95)

ABSTRACT OF THE DISCLOSURE

This is a combination fishing implement or tool wherein it has a float and a fishhook disgorger, in which combination the float acts as the handle for the fishhook disgorger, the shank of which passes lengthwise through the float. The float and fishhook disgorger also cooperate in frictionally binding and holding the fishline in a grooved portion of one end of the float, under the influence of a compression spring located at the opposite end of the float, on the shank of the fishhook disgorger. On the end of the fishhook disgorger shank opposite to said spring there is provided an extractor tip with a prong portion which is inclined moderately sidewise from said shank to facilitate engaging the fishhook during the disgorging operation.

---

The present invention relates broadly to a fishing implement, and in its specific phases to a combination fishline float attachment and fishhook removal instrument.

There has been a great increased interest in outdoor sporting activities over the past few years. Persons formerly not active in outside sports have taken up these activities at various rates of interest. For example, in the past, most fishermen have been very active participants in the sport, having proper equipment, knowledge of the sport, et cetera. At the present time, there are many persons active in the sport of fishing who do not have an abundance of equipment and experience in this activity. Many persons with great interest can only go out infrequently; some like to carry a very limited amount of fishing equipment with them at all times so that they can take advantage of opportunities for fishing on very short notice and in various areas.

One of the problems experienced by both the new and experienced fishermen alike is the art of removing a barbed fishhook from a fish after the fish has swallowed the hook bait down its gullet. Having the necessary skill and proper equipment to do this has been a problem. Many fishermen use pliers; other have various forms of tools to remove the barbed fishhooks which have been swallowed. It is a problem to remember to bring the necessary tool with you when you are fishing. Another problem is getting to the tool when it is needed, even when you have remembered to bring it along. This proves to be a considerable problem with fishermen. The rocking of the boat, possibility of injury when it is required to be passed back and forth, and in general it proves to be quite cumbersome.

It is a recognition of these difficulties and shortcomings and the non-availability of a commercially satisfactory device to meet this problem which has led me to the conception and development of the present invention.

Accordingly, among the objects of the present invention is to provide a combination fishline float attachment and a fishhook removal tool.

Another object is to provide a novel combination tool which is easily attached to a fishline and at a position desired.

A further object is to provide a buoyant member for attachment along a fishline which will clamp securely to the fishline, yet be easily removed.

A further object of the present invention is to provide a fishhook removal tool which is provided with a positive contact means with a buoyant member so that the buoyant member can be used as a handle means when a fishhook is required to be removed.

Also, an object of the present invention includes the provision of a combination tool capable of accomplishing the above objectives with a minimum of material cost and fabricating expense, and at the same time being composed of a simple and yet ruggedly formed structure which is very reliable in application.

Still further objects and advantages of the present invention will appear as the description proceeds.

To the accomplishment of the foregoing and related ends, the invention, then, consists of a special combination tool of a fishhook removal tool and bobber fishline attachment form hereinafter fully described and particularly pointed out in the claims, the annexed drawing and the following description setting forth in detail certain means to carry out the invention, such disclosed means illustrating, however, but several of the various ways in which the principle of the invention may be used.

Figure 1:
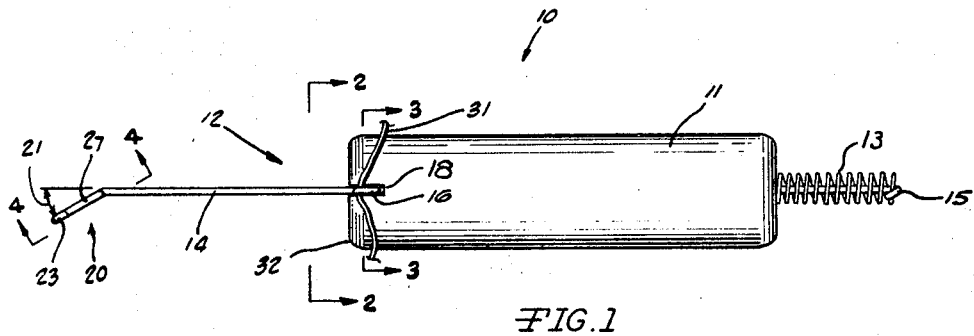
FIGURE 1 is a side plan view illustrating a combination fishline float attachment and fishhook extractor tool embodying the principles of the present invention.

Referring generally to FIGURE 1, there is shown a combination fishline float and fishhook extractor tool, generally referred to as the combination tool 10. The combination tool 10 is made up of two interacting parts: a buoyant member referred to generally as bobber 11 and an extractor tool 12. These members are held together by a spring member 13 in a manner to be explained in detail below.

Figure 9:
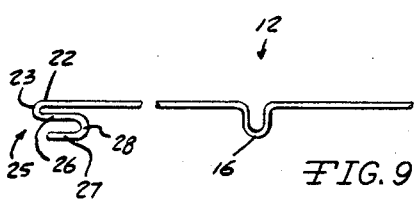
FIGURE 9 is a side view of an extractor tool embodying the features of the present invention.

Referring generally to FIGURE 9, the extractor tool 12 is shown to be made up of a straight wire piece turned into a useable form. The extractor tool 12 has a shank 14, a spring retainer loop 15 at one end of said shank 14, a fishline securing loop 16 substantially at the middle portion of said shank 14, and an extractor tip 20 at the other end of said shank 14.

Figure 2:
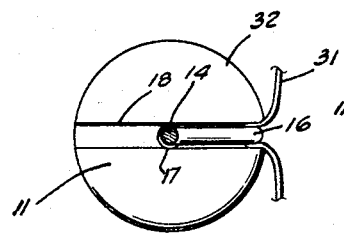
FIGURE 2 is a cross sectional end view taken along line 2—2 of FIGURE 1 showing the bottom end surface of the float member looking in the direction of the arrows.

Referring to FIGURE 2, bobber 11 is shown to have a hole 17 running its length, and a receiving groove 18 which runs across its end portion and is in contact with hole 17. To assemble the combination tool 10, the extractor tool 12 will be in the condition as shown in FIG- URE 9 except spring retainer loop 15 will be straight. The shank 14 will pass through hole 17 with the fishline securing loop 16 being received by receiving groove 18. Spring member 13 will be placed around shank 14 and compressed, and then spring retainer loop 15 will be formed to retain spring member 13. Spring member 13 is compressed and will tend to move the spring retainer loop 15 away from bobber 11 and draw fishline securing loop 16 into receiving groove 18, as illustrated in FIGURE 1. The extractor tip 20, as viewed in FIGURE 1, is inclined with respect to the axis of shank 14 at an angle represented as 21. In the present embodiment, the angle 21 is approximately 30°. The purpose of this angle will be explained in more detail below.

Figure 3:
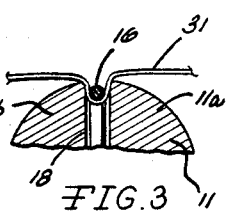
FIGURE 3 is a partial cross sectional end view taken generally along line 3—3 of FIGURE 1 illustrating the securing action by the extractor tool and the buoyant member in securing themselves at a desired position along the fishline looking in the direction of the arrows.
Figure 4:
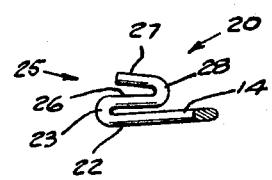
FIGURE 4 is a partial sectional view taken along line 4—4 of FIGURE 1 illustrating the bifurcated hook engagement member of the extractor tool looking in the direction of the arrows.

Referring to FIGURE 4, the portion of the extractor tip 20 extending at the end of shank 14 is generally referred to as shank tip portion 22. Shank tip portion 22 is part of the extractor tip 20, and is inclined from shank 14 forming the angle 21. At the end of shank tip portion 22 there is a connecting portion 23 which connects the shank tip portion 22 to a bifurcated hook engaging member 25. The bifurcated hook engaging member 25 has a first prong member 26 and a second prong member 27 connected together by a connecting portion 28. The function and operational use of the extractor tool 12 and its various parts will be explained in more detail below. To discuss the fishline float attaching feature of the combination tool 10, we refer generally to FIGURES 1, 2 and 3, where the combination tool 10 is secured along a fishline 31 at a desired point. When it is desired to remove or to adjust the position of the combination tool 10 with the fishline 31, the spring member 13 is depressed by pushing on the spring retainer loop 15, moving the fishline securing loop 16 away from receiving groove 18, thus freeing the fishline 31 from the bobber 11 of the combination tool 10. When the spring member 13 is depressed, the combination tool 10 is free to move along the fishline 31 or the fishline 31 can be moved directly out of contact with the extractor tool 12 by moving it out through the open portion of fishline retaining loop 16.

When the extractor tool 12 is to be used, the combination tool 10 can be removed from the fishline 31, or it can remain attached to the fishline 31. The extractor tool 12 tends to move to the right along the axial line of hole 17 with respect to the bobber 11 because of the action of spring member 13. This causes a wedging action between the fishline 31, the fishline retaining loop 16 and receiving groove 18. The fishline retaining loop 16 is just a little smaller than the outer diameter of bobber 11, as viewed in FIGURES 2 and 3. Thus, the wedging action due to friction caused by pulling fishline 31 into groove 18 takes place on rounded surface 32 of bobber 11. Because of this frictional wedging action, as illustrated in FIGURE 3, an increased holding force is created between fishline 31 and the bobber body portions 11a and 11b than is applied to the extractor tool 12 by the pulling action of spring member 13. This frictional wedging action assures a good gripping will take place between the combination tool 10 and the fishline 31.

Figure 5:
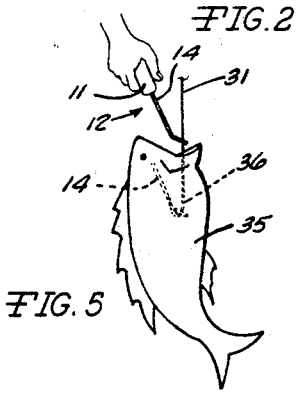
FIGURE 5 is a side view showing a fish with a barbed hook swallowed in its gullet and the tool as it is applied in use.
Figure 6:
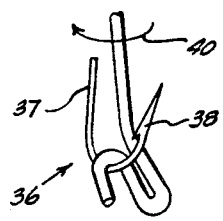
FIGURE 6 is an enlarged view showing the physical relationship between the bifurcated hook engaging member of the extractor tool and the barbed hook of the fishline.

When a fish 35 swallows the barbed hook 36, as viewed in FIGURE 5, the fisherman grasps the combination tool 10 by the bobber 11 and guides it so that the bifurcated hook engaging member 25 slides along the line 31 until it contacts the barbed hook 36, as illustrated in phantom in FIGURE 5. The user then, holding line 31 with one hand, twists the extractor tool 12 with the hand gripping the bobber 11. This causes the second prong member 27 to act on a shank portion 37 of barbed hook 36, and first prong member 26 will act on the tip portion 38 of barbed hook 36, when the combination tool 10 is turned in the direction of arrow 40 as illustrated in FIGURE 6. If the combination tool 10 is turned in the opposite direction to arrow 40, as illustrated in FIGURE 6, the shank portion 37 and tip portion 38 will be acted upon by first prong member 26 and second prong member 27, respectively. This action gives a fisherman the leverage needed to cause the barbed hook 36 to cut its way through the innards of the fish so that it can be removed from the fish. The angle 21 allows the user to move the combination tool 10 along the line 31 so that the combination tool 10 tends to be somewhat in a parallel relationship with respect to fishline 31 as it is moved in position to release barbed hook 36. This permits the user to see the extractor tip 20 move into position, even with a small mouth opening in the fish 35.

Figure 7:
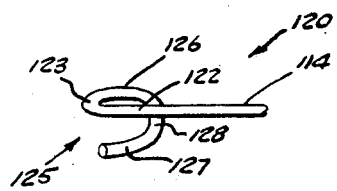
FIGURE 7 is an alternate construction of the bifurcated hook engaging member viewed in a direction similar to FIGURE 4.

Referring generally to FIGURE 7, an alternate view of an extractor tip is shown. The extractor tip 120 is connected to a shank 114 which has remaining features similar to the extractor tool shown in FIGURE 9. The extractor tool has a shank tip portion 122 which is connected to a bifurcated hook engaging member 125 by connecting portion 123. The bifurcated hook engaging member 125 has a first prong member 126 and a second prong member 127, joined together by connecting portion 128. This extractor tip 120 will have the fishline 31 contacting it at connecting portion 128 between shank tip portion 122 and second prong member 127 while moving it into removal position. The shank tip portion 122 and second prong member 127 will act on the barbed hook 36, similar to the action of second prong member 27 and first prong member 26, respectively.

Figure 8:
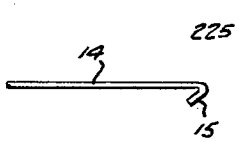
FIGURE 8 is an alternate construction of the bifurcated hook engaging member viewed in a direction similar to FIGURE 4.

Referring generally to FIGURE 8, we have a second alternate construction of an extractor tip. This particular embodiment illustrates an extractor tool 12 made out of flat stock. A shank 214 has connected to it an extractor tip 220 which has a shank tip portion 222. The shank tip portion 222 forms part of a bifurcated hook engaging member 225. The shank tip portion 222 is connected to a prong member 227 by a connecting portion 224. The fishline will act on the bifurcated hook engaging member 225 at connecting portion 224 between prong member 227 and shank tip portion 222. The prong member 227 and the shank tip portion 222 will act on the barbed hook 36, similar to the action of second prong member 27 and first prong member 26, respectively.

While but several forms of the invention have been shown and described, other forms within the spirit and scope of the invention will now be apparent to those skilled in the art. Therefore, the embodiment shown in the drawing is to be considered as being merely set forth for illustrative purposes and is not intended to limit the scope of the invention herein described and shown.

Other modes of applying the principle of my invention may be employed, instead of those explained, change being made as regards the article and combinations herein disclosed, provided the means stated by any of the following claims or the equivalent of such stated means be employed.

I therefore particularly point out and distinctly claim as my invention:

1. A fishing implement which comprises a handle member useable as a fishing float, said handle member having wholly within same a longitudinal opening extending lengthwise therethrough together with an open, exposed, crosswise slot at one end of said longitudinal opening with said exposed crosswise slot extending at least substantially from the end of said longitudinal opening to one side of said handle member, a rod member slidably extending through said longitudinal opening, said rod member having, substantially midlength of same, a sidewise extending fishline securing means engageable with said exposed crosswise slot, a resilient means mounted on said rod member at the end of said handle member remote from said exposed crosswise slot, retainer means on the end of said rod for holding said resilient means moderately compressed and said fishline securing means of said rod member releasably engageable in said exposed crosswise slot, and a sidewise inclined fishhook engaging and disgorging means on the end of said rod member remote from said end of same having said retainer means.

2. A fishing implement which comprises a handle member useable as a fishing float, said handle member having wholly within same a longitudinal opening extending lengthwise therethrough together with a slot at one end of said longitudinal opening with said slot extending at least substantially to one side of said handle member, a rod member slidably extending through said longitudinal opening, said rod member having a sidewise extending fishline securing means engageable with said slot, a resilient means mounted on said rod member at the end of said handle member remote from said slot, retainer means on the end of said rod for holding said resilient means moderately compressed and said fishline securing means releasably engageable in said slot, and a fishhook engaging means on the end of said rod member remote from said end of same having said retainer means, wherein said sidewise extending fishline securing means is in the form of a loop in said rod member, said slot and loop being of a sufficiently close fit, when said loop is in said slot, to frictionally receive, grip and hold a fishline extending through said loop.

3. A fishing implement as set forth in claim 2, wherein said fishhook engaging means on the end of said rod is tilted moderately sidewise with the portion immediately beyond the point of tilting being of substantially open S-shape and with the S-shape portion being generally in a common plane.

4. A fishing implement as set forth in claim 2, wherein said resilient means is in the form of an open coil compression spring.

5. A fishing implement as set forth in claim 2, wherein said fishhook engaging means on the end of said rod is tilted moderately sidewise with the portion immediately beyond the point of tilting being of substantially open S-shape and with the S-shape portion being generally in a common plane.

6. A fishing implement as set forth in claim 2, wherein said fishhook engaging means on the end of said rod has a shank tip portion tilted moderately sidewise from the rod, and a substantially U-shaped member connected to and overlapping the end of said shank tip portion.

7. A fishing implement as set forth in claim 2, wherein said fishhook engaging means on the end of said rod has a shank tip portion tilted moderately sidewise from the rod, a connecting portion extending from said shank tip portion between the point of tilting and the end of said shank tip portion, and a prong member extending from the end of said connecting portion parallel with said shank tip portion.

8. A fishing implement as set forth in claim 3, wherein said rod member is relatively rigid, tough and springy so as to firmly resist permanent deformation under conditions of use even when said fishhook engaging means is used for disgorging a fishhook from a fish.

9. A fishing implement as set forth in claim 8, wherein said sidewise extending fishline securing means and said slot in said handle member are of a construction to cooperate in supporting said rod member under endwise pushing and twisting of same.

10. A fishing implement as set forth in claim 5, wherein said resilient means is in the form of an open coil compression spring, and wherein said rod member is relatively rigid, tough and springy so as to firmly resist, at least in the area extending through said loop to said substantially open S-shape portion, permanent deformation under conditions of use.

References Cited
UNITED STATES PATENTS

| | | | |
|---|---|---|---|
| 1,504,065 | 8/1924 | Lower | 43—44.95 |
| 2,560,129 | 7/1951 | Rhotehamel | 43—44.95 |
| 2,561,281 | 7/1951 | Lawrence | 43—53.5 |
| 2,724,207 | 11/1955 | Miller et al. | 43—53.5 |

SAMUEL KOREN, *Primary Examiner.*

D. J. LEACH, *Assistant Examiner.*